United States Patent Office 3,162,651
Patented Dec. 22, 1964

3,162,651
THIENYLALKYL ESTERS OF 3-SULPHAMYL-4-CHLOROBENZOIC ACID
Ernst Jucker, Binningen, Basel-Land, and Adolf J. Lindenmann, Basel, Switzerland, assignors, by mesne assignments, to Fidelity Union Trust Company, executive trustee under Sandoz Trust of May 4, 1955
No Drawing. Original application May 8, 1961, Ser. No. 108,308, now Patent No. 3,119,843, dated Jan. 28, 1964. Divided and this application Apr. 30, 1962, Ser. No. 191,268
2 Claims. (Cl. 260—332.2)

The present application is a division of our copending application Serial No. 108,308, filed May 8, 1961 and now U.S. Patent No. 3,119,843, granted January 28, 1964.

The present invention relates to new sulphonamides having the structural Formula I,

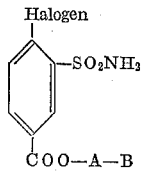

wherein A represents methylene and ethylene and B is selected from the group consisting of nitrogen, oxygen and can also represent a sulphur-containing heterocyclic group linked with one of its carbon atoms to the radical A, their acid addition salts and pharmaceutical compositions containing, in addition to an inert carrier, a compound I and/or an acid addition salt thereof.

The sulphonamides of this invention and their acid addition salts can be prepared by reacting a compound of the general Formula II,

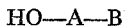

HO—A—B    II wherein A and B have the above significance, with a 3-sulphamyl-4-halogenobenzoyl chloride, and when an acid addition salt is required, salifying with an organic or inorganic acid.

Suitable meanings for the radical B are, for example, a 2- or 3-furyl or tetrahydrofuryl group, a 2-, 3- or 4-pyridyl or -piperidyl group, a 2-, 3- or 4-tetrahydropyranyl group, a 2-, 3- or 4-quinolyl group or a 2- or 3-thienyl group.

The preparation of the new sulphonamides can be carried out as follows: a suspension of 3-sulphamyl-4-chlorobenzoyl chloride is mixed with a compound II until complete dissolution has taken place. The excess of the compound II is removed by evaporation in a vacuum. The resulting oily residue is then rubbed to crystallize out the required ester which is then purified.

The compounds of the invention, which are at room temperature solid crystalline compounds, have interesting pharmacodynamic properties and/or may be used as intermediate compounds for the production of pharmaceuticals. The exemplified compounds show, depending upon the nature of the radical A and B in Formula I, diuretic, sodium uretic and chloride uretic properties. In tests with dogs, they have been found to be effective on peroral administration; for example 3-sulphamyl-4-chlorobenzoic acid-tetrahydrofurfuryl ester has been found to be a particularly quick acting salidiureticum when administered to dogs perorally. 0.5 mg./kg. given to dogs perorally has more than doubled excretion of electrolyte after 2 hours.

The compounds can be administered in therapeutic dosages in conventional vehicles as in the form of a tablet as these compounds are effective upon oral administration as well as upon injection.

Examples of suitable acids for salifying the compounds I are as follows: hydrochloric, hydrobromic, sulphuric, oxalic, tartaric, acetic, hexahydrobenzoic, methanesulphonic and fumaric acid.

The preparation of these compounds is more fully described in the following example. It is to be understood, however, that the example is illustrative of the compounds embraced by this invention and are not to be construed as limiting the invention to the particular compounds specifically described. All temperatures are stated in degrees centigrade.

EXAMPLE 1

*3-Sulphamyl-4-Chlorobenzoic Acid Thienyl-(2')-Methyl Ester*

5.1 g. of 3-sulphamyl-4-chlorobenzoyl chloride are added portionwise to a solution of 2.3 g. of thiophene-2-carbinol and 2.0 g. of triethylamine in 30 cc. of benzene while being stirred. An oil begins to separate from the reaction mixture. Stirring of the mixture is continued at 20–25° for another 60 hours, followed by evaporation in a vacuum until dry. The oily evaporation residue is divided between 300 cc. of acetic acid ethyl ester and 300 cc. of water, the two phases being separated and the acetic acid ethyl ester solution dried over magnesium sulphate. After the solvent has been distilled off in a vacuum the oily residue is chromatographed on alumina, the 3-sulphamyl-4-chlorobenzoic acid thienyl-(2')-methyl ester being eluted with a solvent mixture of chloroform and methanol (9:1). After recrystalization from methanol the sulphonamide derivative melts at 133–134°.

We claim:
1. A compound of formula

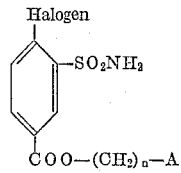

wherein A is a member of the class consisting of the 2- and the 3-thienyl and $n$ is an integer of from 1 to 2 inclusive.

2. 3-sulphamyl-4-chlorobenzoic acid thienyl-(2')-methyl ester.

References Cited in the file of this patent
UNITED STATES PATENTS 2,591,518    Dazzi ------------------ Apr. 1, 1952
2,789,938    Wilcox et al. ----------- Apr. 23, 1957